United States Patent
Shin et al.

(10) Patent No.: US 8,681,414 B2
(45) Date of Patent: Mar. 25, 2014

(54) ELECTROPHORETIC DISPLAY DEVICE AND METHOD FOR MANUFACTURING THE SAME

(75) Inventors: Sang Il Shin, Gyeonggi-do (KR); Choon Ho Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 101 days.

(21) Appl. No.: 13/171,670

(22) Filed: Jun. 29, 2011

(65) Prior Publication Data

US 2012/0019895 A1    Jan. 26, 2012

(30) Foreign Application Priority Data

Jul. 22, 2010    (KR) ........................ 10-2010-0070999

(51) Int. Cl.
*G02B 26/00*    (2006.01)
*G09G 3/34*    (2006.01)
*G03G 13/00*    (2006.01)

(52) U.S. Cl.
USPC .............................. 359/296; 345/107; 430/31

(58) Field of Classification Search
USPC ............... 359/296; 349/33; 345/49, 105, 107; 430/31–32
See application file for complete search history.

(56) References Cited

U.S. PATENT DOCUMENTS

| | | | |
|---|---|---|---|
| 6,524,153 B1 | 2/2003 | Ikeda et al. | |
| 7,095,477 B2 * | 8/2006 | Liang et al. | 349/153 |
| 2003/0030884 A1 * | 2/2003 | Minami | 359/296 |
| 2003/0231162 A1 * | 12/2003 | Kishi | 345/107 |
| 2008/0024432 A1 * | 1/2008 | Lee et al. | 345/107 |

* cited by examiner

*Primary Examiner* — Dawayne A Pinkney
(74) *Attorney, Agent, or Firm* — Morgan, Lewis & Bockius LLP

(57) ABSTRACT

An electrophoretic display device includes a lower substrate having a plurality of pixel electrodes formed on the lower substrate and having partition walls formed on the lower substrate surrounding the pixel electrodes, the pixel electrodes and partition walls defining a plurality of sub-pixels; an upper substrate bonded with the lower substrate, the upper substrate having a common electrode formed thereon with an encapsulation layer formed on an area of the common electrode corresponding to the plurality of the sub-pixels; an electrophoretic dispersion liquid comprising a plurality of charged particles colored to display predetermined colors, the electrophoretic dispersion liquid injected into the plurality of the sub-pixels defined by the pixel electrodes and the partition walls; and an interlayer formed between the encapsulation layer and the electrophoretic dispersion liquid.

21 Claims, 5 Drawing Sheets

< Error Generated By Incomplete Filling of Electrophoretic
Dispersion Liquid & Error Generated By Vapor >

[ Related Art ]
FIG.4

< Error Generated By Sealant Overflow Inside And Outside Of Panel >

ELECTROPHORETIC DISPLAY DEVICE AND METHOD FOR MANUFACTURING THE SAME

CROSS REFERENCE TO RELATED APPLICATION

This application claims the benefit of the Patent Korean Application No. 10-2010-0070999 filed on Jul. 22, 2010, which is hereby incorporated by reference as if fully set forth herein.

BACKGROUND OF THE INVENTION

1. Field of the Disclosure

The present invention relates to an electrophoretic display device, and more particularly, to an electrophoretic display device to enhance both productivity and reliability with a reduced production cost, and a method for manufacturing the same.

2. Discussion of the Related Art

In general, an electrophoretic display device refers to a device capable of displaying images using electrophoresis wherein colored charge particles are moved by an electric field applied from the outside. Here, 'electrophoresis' means a phenomenon wherein charged particles are moved in electrophoretic dispersion liquid (electrophoretic ink) by coulomb forces when an electric field is applied to the electrophoretic dispersion liquid having the charged particles dispersed therein.

An electrophoretic display device using electrophoresis has a bistability that allows original images to be displayed for a relatively long time even if an applied voltage is removed. In other words, the electrophoretic display device can maintain a specific screen for a relatively long time without voltages being continuously applied thereto. As a result, the electrophoretic display device may be applied to e-books, which do not require quick changes of screens.

Moreover, an electrophoretic display device has no dependence on viewing angle and can provide images that are comfortable to eyes and remarkably similar to paper, unlike a liquid crystal display device. As a result, demands for the electrophoretic display devices have been increasing because the electrophoretic display devices are flexible, have low power consumption, and are eco-friendly.

Such an electrophoretic display device may be categorized, based on an electrophoretic layer (or film) structure, as a microcapsule type or a microcup type.

Figure 1:
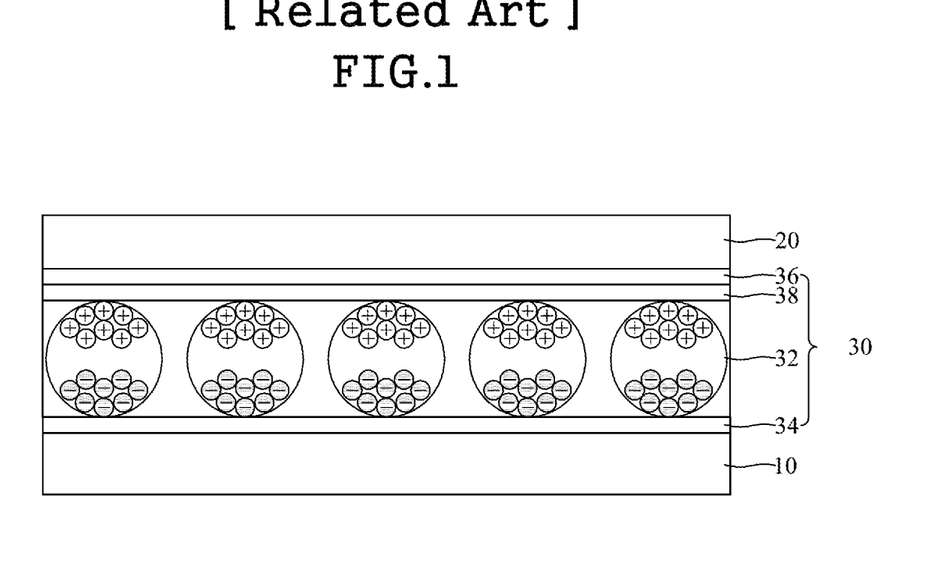
FIG. 1 is a sectional view illustrating a structure of a microcapsule type electrophoretic display device according to the related art.

FIG. 1 is a sectional view illustrating a structure of a microcapsule type electrophoretic display device according to a related art. With reference to FIG. 1, a microcapsule type electrophoretic display device includes lower and upper substrates 10 and 20 bonded to each other with an electrophoretic film 30 disposed between the lower substrate 10 and the upper substrate 20.

The electrophoretic film 30 includes a first adhesive layer 34 formed of a transparent material, a second adhesive layer 36, a common electrode 38 formed of a transparent conductive material between the first and second adhesive layers 34 and 36, and a plurality of microcapsules having charged particles and electrophoretic dispersion liquid. Although not shown in FIG. 1, the lower substrate 10 includes a plurality of pixel electrodes opposed to the common electrode 38 and a plurality of thin film transistors (TFT) configured as switching devices to apply voltages to the plurality of the pixel electrodes.

The microcapsule 32 includes dielectric solvent, positive (+) charged particles and negative (−) charged particles. The charged particles provided in the microcapsule are moved within the dielectric solvent to present an image.

According to the electrophoretic display device of FIG. 1, the upper substrate 20, the lower substrate 10 and the laminated electrophoretic film 30 are each manufactured. After that, the electrophoretic film 30 is disposed between the lower substrate 10 and the upper substrate 20.

Here, the electrophoretic film 30 is attached to the upper substrate 20 by the second adhesive layer 36, and a release film is kept attached to the first adhesive layer 34. Just before it is laminated on the lower substrate 34, the release film is eliminated. After that, the electrophoretic film 30 is attached to the lower substrate 10 by the first adhesive layer 34.

As described above, the manufacture process of the electrophoretic display device is quite complicated because the lower substrate 10, the upper substrate 10 and the electrophoretic film 30 have to be manufactured separately. As a result, the manufacture of the electrophoretic display device will require much time and productivity might deteriorate disadvantageously. Also, the electrophoretic film 30 additionally has to be manufactured and production cost might be disadvantageously increased.

Figure 2:
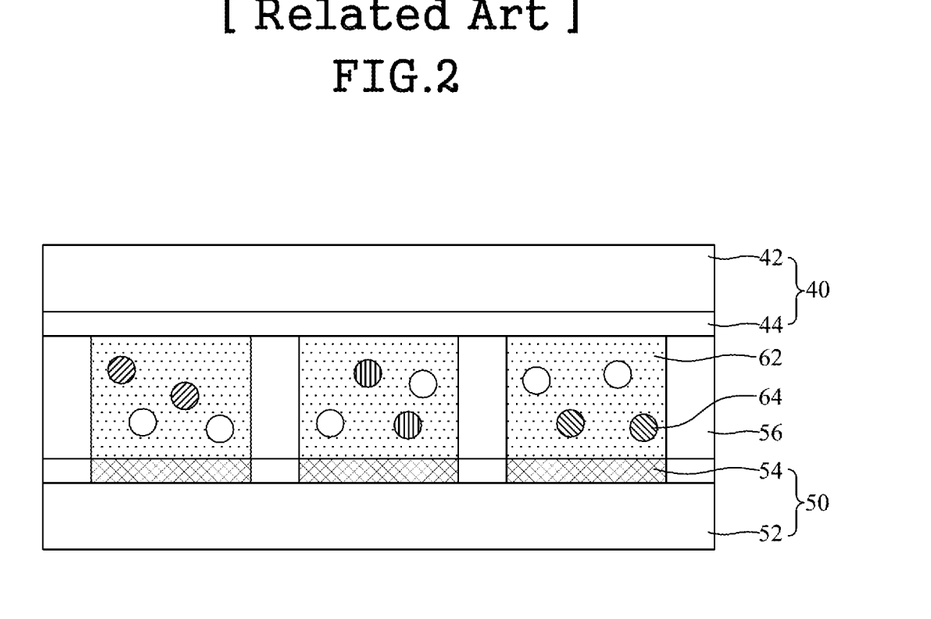
FIG. 2 is a sectional view illustrating a structure of a microcup type electrophoretic display device according to the related art.

FIG. 2 is a sectional view illustrating a structure of a microcup type electrophoretic display device according to the related art. With reference to FIG. 2, a microcup type electrophoretic display device includes an upper substrate 40, a lower substrate 50 and an electrophoretic layer internalized on the lower substrate 50.

The upper substrate 40 includes a base substrate 42 (or a base film) formed of a transparent material and a common electrode 44 formed of a transparent conductive material, for example, Indium Tin Oxide (ITO) or Indium Zinc Oxide (IZO).

The lower substrate 50 includes a base substrate 52 formed of a transparent or opaque material and a plurality of pixel electrodes 54 provided on the base substrate 52, in opposite to the common electrode 44. Here, a plurality of thin film transistors (TFT, not shown) may be formed on the base substrate 52 as switching devices to apply voltages to the plurality of the pixel electrodes 54.

The electrophoretic layer includes partition walls 56 to define sub-pixels formed on the lower substrate 50 to display images and electrophoretic dispersion liquid (or electrophoretic ink) 62 injected into the sub-pixels. Here, the electrophoretic dispersion liquid 62 includes dielectric solvent and a plurality of charged particles 64. The charged particles 64 are moved within the dielectric solvent along an electric field formed by the common electrode 44 and the pixel electrodes 54.

According to the microcup type electrophoretic display device having the above configuration, the electrophoretic dispersion liquid 62 is injected into the sub-pixels defined by the partition walls 56 formed on the lower substrate 50. In other words, the electroporetic dispersion liquid 62 is internalized on the lower substrate 50.

Figure 3:
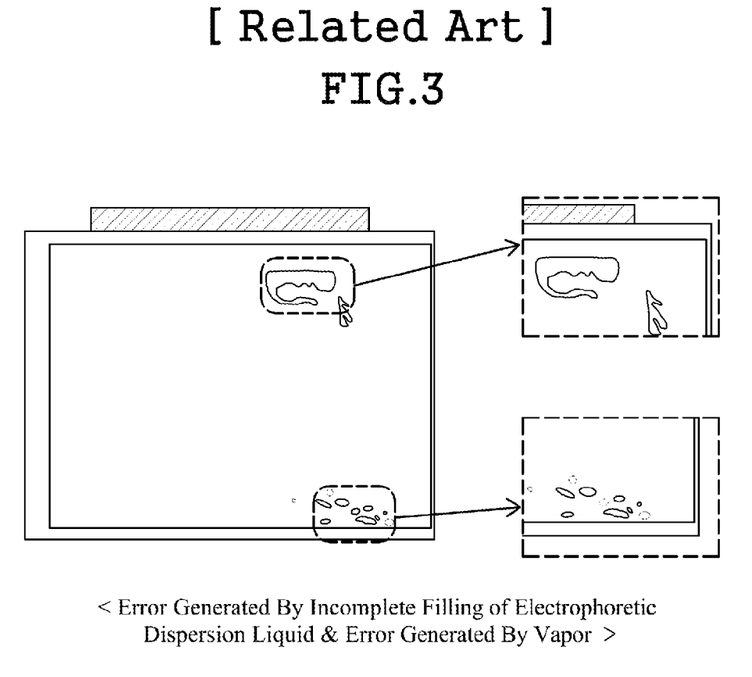
FIG. 3 is a diagram illustrating errors generated by incomplete filling of electrophoretic dispersion liquid and by vapors, respectively.

Here, when the partition walls 56 are formed of an inorganic material, failure of full injection of the electrophoretic dispersion liquid and vapor generation might occur in the filling process of the electrophoretic dispersion liquid 62 as shown in FIG. 3.

The electrophoretic display device has sealant in an outer area of a display region formed on the lower substrate 50 and the sealant is used to bond the upper substrate 40 with the lower substrate 50. A guide configured to prevent overflow of sealant to inner and outer areas of the sealant coated region is not formed.

Figure 4:
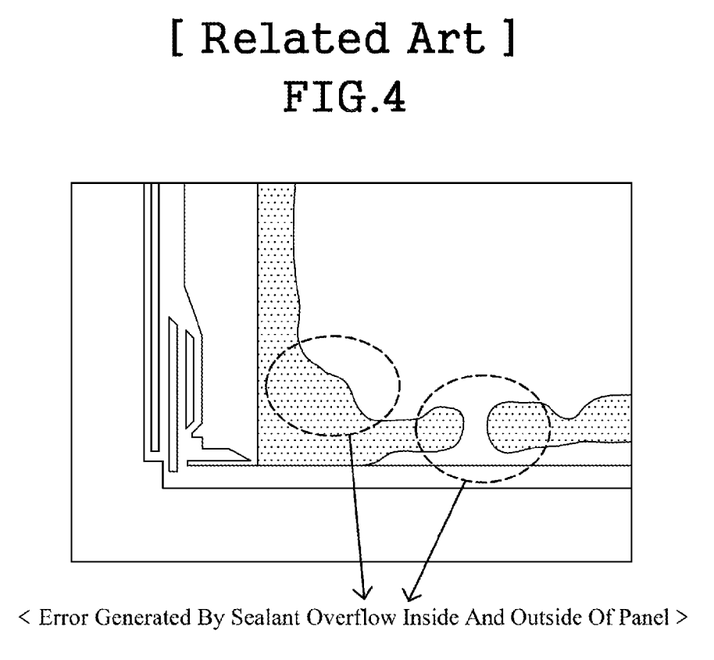
FIG. 4 is a diagram illustrating an error generated by overflow of sealant used to bond upper and lower substrates to each other.

As a result, the sealant used to bond the upper and lower substrates 40 and 50 with each other might overflow to an inside and an outside of a display panel as shown in FIG. 4, thereby resulting in operational errors of the display panel. If the sealant overflows to the inside and outside of the display panel, the bonding process between the upper and lower substrates 40 and 50 might not be performed smoothly and properly.

Furthermore, the sealant overflow causes incomplete closure of the display panel with respect to the outside and the electrophoretic display device happens to be contaminated by external air and water elements disadvantageously. As a result, an error generated by overflowing of sealant used to bond the upper and lower substrates to each other might deteriorate productivity and reliability of the electrophoretic display device.

SUMMARY OF THE INVENTION

Accordingly, the present invention is directed to an electrophoretic display device and a method for manufacturing the same.

An object of the present invention is to provide an electrophoretic display device to enhance productivity thereof, and a method for manufacturing the electrophoretic display device.

Another object of the present invention is to provide an electrophoretic display device to reduce production cost, and a method for manufacturing the electrophortic display device.

A further object of the present invention is to provide an electrophoretic display device to enhance both productivity and reliability thereof, and a method for manufacturing the electrophoretic display device.

A still further object of the present invention is to provide an electrophoretic display device to prevent errors generated by overflow of electrophoretic dispersion liquid (electrophoretic ink) internalized on a lower substrate toward an outer portion of a display panel, and a method for manufacturing the electrophoretic display device.

A still further object of the present invention is to provide an electrophoretic display device to prevent errors generated by overflow of sealant used to bond upper and lower substrates to each other toward an inner or outer portion of the display panel, and method for manufacturing the electrophoretic display device.

A still further object of the present invention is to provide an electrophoretic display device that includes a lower substrate having electrophoretic dispersion liquid internalized thereon.

A still further object of the present invention is to provide a method for manufacturing an electrophoretic display device that internalizes the electrophoretic dispersion liquid on the lower substrate.

A still further object of the present invention is to provide an electrophoretic display device that has a high display quality, and a method for manufacturing the electrophoretic display device.

A still further object of the present invention is to provide an electrophoretic display device that presents various color images, and a method for manufacturing the electrophoretic display device.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an electrophoretic display device comprises a lower substrate having a plurality of pixel electrodes formed on the lower substrate and having partition walls formed on the lower substrate surrounding the pixel electrodes, the pixel electrodes and partition walls defining a plurality of sub-pixels; an upper substrate bonded with the lower substrate, the upper substrate having a common electrode formed thereon with an encapsulation layer formed on an area of the common electrode corresponding to the plurality of the sub-pixels; an electrophoretic dispersion liquid comprising a plurality of charged particles colored to display predetermined colors, the electrophoretic dispersion liquid injected into the plurality of the sub-pixels defined by the pixel electrodes and the partition walls; and an interlayer formed between the encapsulation layer and the electrophoretic dispersion liquid.

In another aspect, a method for manufacturing an electrophortic display device comprises defining a plurality of sub-pixels by forming partition walls on a lower substrate to surround respective pixel electrodes formed on the lower substrate; forming an encapsulation layer on an area of a common electrode formed on an upper substrate, corresponding to the plurality of the sub-pixels; filling electrophoretic dispersion liquid comprising a plurality of charged particles colored to display colors into the plurality of the sub-pixels defined by the pixel electrodes and surrounded by the partition walls; forming an interlayer between the encapsulation layer and the electrophoretic dispersion liquid; and bonding the upper and lower substrate with the interlayer disposed between the upper and lower substrates, wherein the interlayer is formed on one of the upper substrate and the lower substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE INVENTION

Reference will now be made in detail to the specific embodiments of the present invention, examples of which are illustrated in the accompanying drawings. Wherever possible, the same reference numbers will be used throughout the drawings to refer to the same or like parts. As follows, en electrophoretic display device and a method for manufacturing the electrophoretic display device according to exemplary embodiments of the present invention will be described in detail in reference to the accompanying drawings. When the disclosure of the embodiments of the present invention states that a structure is formed 'on' or 'below' another structure, this disclosure should be interpreted to include the structures being in contact with each other as well as there being a third structure is disposed between the structures.

A technical subject matter of the present invention may be applicable to all types of electrophoretic display devices, regardless of color presentation. For explanation sake, a color type electrophoretic display device is embodied to explain the present invention as follows.

The present invention that will be disclosed includes a mono-type electrophoretic display device and an electrophoretic display device including a color filter. That is, charged particles provided in electrophoretic dispersion liquid (electrophoretic ink) are colored with one of red, blue, green, yellow, cyan, magenta, black and white.

The present invention may be applied to the microcup type electrophoretic display device of FIG. 2 as well as the microcapsule type electrophoretic display device of FIG. 1. As follows, the microcup type electrophoretic display device will be used as an example to explain the present invention.

Figure 5:
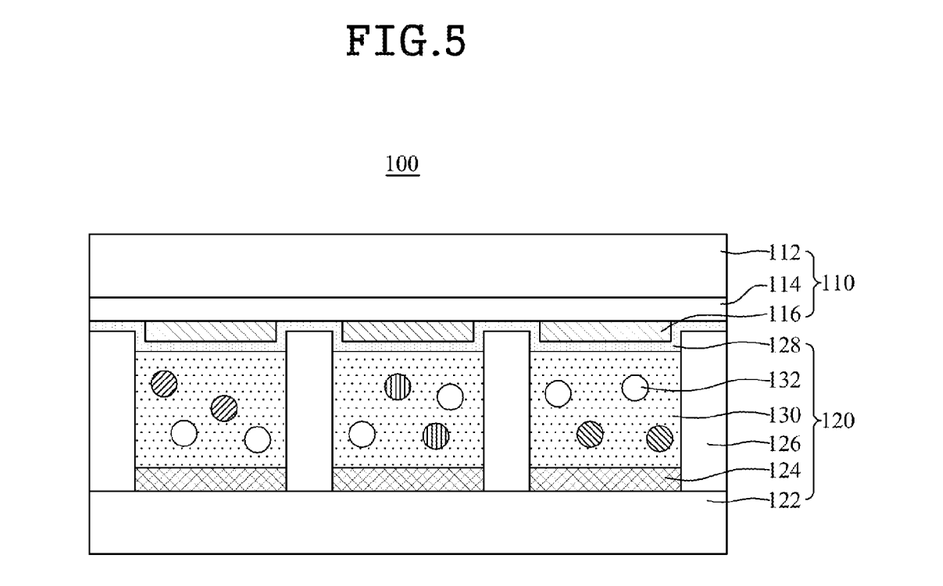
FIG. 5 is a diagram schematically illustrating a structure of an electrophoretic display device according to an exemplary embodiment of the present invention.

FIG. 5 is a diagram schematically illustrating a structure of an electrophoretic display device according to an exemplary embodiment of the present invention. With reference to FIG. 5, the electrophoretic display device 100 according to an exemplary embodiment of the present invention includes an upper substrate 110 having a first base substrate 112, a common electrode 114 with an encapsulation layer 116 formed thereon, a lower substrate 120 having a plurality of pixel electrodes 124, partition walls 126 and an electrophoretic dispersion liquid 130 formed thereon. Here, the electrophoretic dispersion liquid 130 is internalized in a plurality of sub-pixels defined by the partition walls 126 and an interlayer 128 is formed to prevent the electrophoretic dispersion liquid 130 from contacting the encapsulation layer 116 formed on the upper substrate 110 directly. The partition walls 126 of the plurality of sub-pixels may be formed as a single structure to be contiguous.

According to the electrophoretic display device 100 of this exemplary embodiment of the present invention, the sub-pixels are filled with the charged particles 132 and the charged particles 132 in the sub-pixels may be moved within dielectric solvent by voltages applied to the common electrode 114 and the plurality of the pixel electrodes 124, thereby presenting mono-images and color-images. The upper substrate 110 includes a first base substrate 112 (or a base film) formed of transparent glass or plastic, the common electrode 114 formed on the first base substrate 112 and the encapsulation layer 116 formed to internalize the electrophoretic dispersion liquid 130 on the upper substrate 110 and to bond the upper and lower substrates 110 and 120 with each other.

Here, the first base substrate 112, the common electrode 114 and the encapsulation layer 116, which compose the upper substrate 110, should be transparent to display images. As a result, the first base substrate 112 is formed of a flexible transparent material and the common electrode 114 is formed of a conductive transparent material, for example, indium tin oxide (ITO) and indium zinc oxide (IZO). The encapsulation layer 116 is formed on a predetermined area of the common electrode 114 of the upper substrate 110, corresponding to the sub-pixels where images are displayed.

The encapsulation layer 116 is formed to encapsulate the electrophoretic dispersion liquid 130. A transparent material is coated on the common electrode 114 of the upper substrate 110 and the coated material is patterned in a photolithography process to correspond to the sub-pixels to form the encapsulation layer 116. Alternatively, the encapsulation layer 116 may be formed in a roll-to-roll process using a roller having an embossed-and-engraving pattern. Here, a material used to form the encapsulation layer 116 formed on the upper substrate 110 may be identical to or different from a material used to form the partition walls 126, which will be described in detail later.

The lower substrate 120 includes a second base substrate 122 (or a base film), a pixel electrode 124, partition walls 126, electrophoretic dispersion liquid 130 and an interlayer 128. A plurality of gate lines (not shown), data lines (not shown) are formed on the second base substrate 122 with thin film transistors (TFT, not shown) formed at intersections between the data lines and the gate lines, respectively. The electrophoretic dispersion liquid 130 is injected into the sub-pixels defined by the partition walls 126 to be internalized on the lower substrate 120.

The second base substrate 122 may be formed of a transparent glass substrate, a plastic substrate with flexibility or a metal substrate. The second base substrate 122 does not necessarily have to be transparent, because it is located on a side opposite to a screen displaying images.

Each of the gate and data lines may be a single layer formed of silver (Ag), aluminum (Al) or alloy of Ag and Al, with low resistivity. Alternatively, the gate and data lines may be a multilayer including such a single layer and another layer formed of chrome (Cr), titanium (Ti) or tantalum (Ta) with good electrical characteristics.

A gate insulation layer formed of a nitride layer may be located between the gate line and the data line. The thin film transistor (TFT) is formed at every intersection between the gate lines and the data lines. Here, gate electrodes of the thin film transistors (TFT) may be connected with the gate lines and source electrodes of the thin film transistors (TFT) may be connected with the data lines. Drain electrodes of the thin film transistors (TFT) may be connected with the pixel electrodes 124.

The pixel electrodes 124 are formed to correspond to the plurality of the sub-pixels defined by the partition walls 126. The pixel electrodes 124 apply voltages to the sub-pixels by the switching of the thin film transistors (TFT). The pixel electrodes 124 are electrically connected with the drain electrodes of the thin film transistors via contact holes, respectively. The pixel electrodes 124 may be formed of a material, for example, copper, aluminum and indium tin oxide (ITO). Alternatively, the pixel electrodes 124 may be formed by multilayering of nickel and/or gold on the copper, aluminum or indium tin oxide (ITO) layer.

The partition walls 126 are formed on the lower substrate 120 to define the plurality of the sub-pixels. The partition walls 126 are formed surrounding the pixel electrodes 124 to define the sub-pixels. Here, the partition walls 126 may be formed of an non polar organic material with physical properties identical to physical properties of the electrophoretic dispersion liquid 130 internalized in the sub-pixels. For example, partition walls 126 and the electrophoretic dispersion liquid 130 includes the dielectric solvent without polarity. The partition walls 126 may be formed in a photolithography or mold printing process with a predetermined height of 1 um~100 μm. As discussed above, the partition walls 126 on the lower substrate 120 may be formed as a single structure to be contiguous.

The electrophoretic dispersion liquid 130, including the plurality of charged particles 132 and the dielectric solvent, is injected into the sub-pixels defined by the partition walls 126. In other words, the electrophoretic dispersion liquid 130 is internalized in the lower substrate 120. Here, the sub-pixels formed on the lower substrate 120 may be filled with the electrophoretic dispersion liquid 130 using die coating, casting, bar coating, dispense, squeezing, screen printing, inkjet printing, or a photolithography method.

The electrophoretic dispersion liquid 130 includes the dielectric solvent without polarity, and the plurality of the charged particles 132 charged to have a positive (+) or negative (−) pole. That is, some of the charged particles 132 may be charged to have a positive pole (+) and the others may be charged to have a negative pole (−). At this time, the charged particles 132 may be colored with at least one of red, blue, green, yellow, cyan, magenta, black and white colors.

If by an outer wall surrounding the electrophoretic dispersion liquid 130 are not identical to the physical properties possessed by the electrophoretic dispersion liquid 130, the electrophoretic dispersion liquid 130 is not completely injected. As a result, incomplete filling might occur and errors might be caused by vapors generated in the filling process.

As mentioned above, the electrophoretic display device according to this exemplary embodiment of the present invention includes the electrophoretic dispersion liquid 130 formed of the organic material to have the identical physical properties to those of the outer walls surrounding the electrophoretic dispersion liquid 130 internalized on the lower substrate 120, that is, the partition walls 126. For example, the partition walls 126 and the dielectric solvent have the non polarity properties.

As a result, the internalization process of the electrophoretic dispersion liquid 130 on the lower substrate 120 may be performed smoothly and the errors that might be generated in the bonding between the upper and lower substrates 110 and 120 may be prevented.

Furthermore, the driving ability of the electrophoretic display device may be enhanced because the electrophoretic dispersion liquid 130 is internalized on the lower substrate 120.

Additionally, various color images can be presented because the charged particles 132 are colored with a variety of colors and a display quality of the electrophoretic display device may be enhanced accordingly.

If the charged particles 132 directly contact the encapsulation layer 116, an error might be generated in initial arrangement or an electrification property might be lost. That is, even if an electric field is applied to the sub-pixels, the charged particles 132 will not be moved and an error of image display failure might occur. To prevent the charged particles 132 from contacting the encapsulation layer 116 directly, the interlayer 128 is formed to correspond to the encapsulation layer 116 formed on the upper substrate 110. Here, the encapsulation layer 116 and interlayer 128 have the non polarity properties.

Thus, the interlayer 128 is formed on the partition walls 126 and the sub-pixels filled with the electrophoretic dispersion liquid 130. Here, the interlayer 128 may be a thin film formed of an insulating organic material with a thickness of dozens of nanometers (nm). For example, the interlayer 128 may be formed of metal ethyl keton (MEK). Also, the interlayer 128 may be provided with a yellow tint to improve contrast.

To form the interlayer 128, a transparent material, for example, metal ethyl keton, is coated on the partition walls 126 and the sub-pixels filled with the electrophoretic dispersion liquid 130. After that, an imprinted or photolithograph process may be performed to the coated transparent material and the interlayer 128 is formed accordingly. Alternatively, the interlayer 128 may be formed in a roll-to-roll process, which uses a roller having an embossed-and-engraving pattern.

The interlayer 128 is formed on the lower substrate 120 in one exemplary embodiment. Another embodiment of the present invention has the interlayer 128 configured to prevent the charged particles 132 from directly contacting the encapsulation layer 116. There is no limitation of the substrates (the upper substrate 110 or the lower substrate 120) where the interlayer 128 is formed.

According to the embodiment the electrophoretic display device 100 including the above configuration according of the present invention, the upper substrate 110 is bonded to the lower substrate 120 using the encapsulation layer 116 of the upper substrate 110. As a result, the electrophoretic display device can prevent the error generated by the overflow of the sealant used to bond the upper and lower substrates with each other.

Also, an error of electrophoretic display device contamination generated by external air and water elements may be prevented by complete closure of the display panel according to the present invention. As a result, productivity and reliability of the electrophoretic display device may be enhanced.

As follows, a method for manufacturing the electrophoretic display device according to exemplary embodiments of the present invention will be described in reference to FIGS. 6 to 8.

Figure 6:
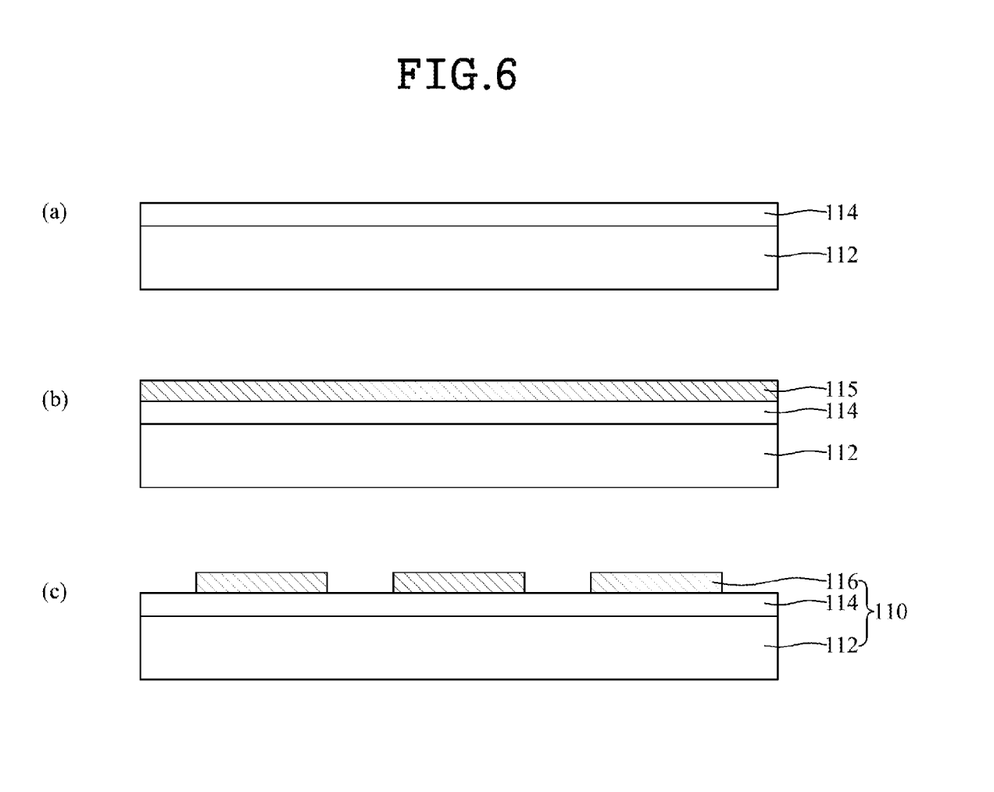
FIG. 6 is a diagram illustrating a method for manufacturing an upper substrate of the electrophoretic display device according to an exemplary embodiment of the present invention.

FIG. 6 is a diagram illustrating a method for manufacturing the upper substrate of the electrophoretic display device according to an exemplary embodiment of the present invention.

As shown in FIG. 6(a), a conductive material, such as indium tin oxide (ITO) or indium zinc oxide (IZO), is provided on the first base substrate (or base film) 112 formed of transparent glass or flexible transparent plastic, to form the common electrode 114.

Then, as shown in FIG. 6(b), a transparent material 115 is coated on the first base substrate 112 to cover the common electrode 114.

After that, as shown in FIG. 6(c), the transparent material 115 coated on the first base substrate 12 is patterned using an imprinting or photolithography process, and the encapsulation layer 116 is then formed. At this time, the encapsulation layer 116 is formed corresponding to sub-pixels for displaying images.

Here, the transparent material used to form the encapsulation layer 116 formed on the upper substrate 110 may be identical to or different from a material used to form the partition walls 126, which will be described later in detail. Alternatively, the encapsulation layer 116 may be formed in a roll-to-roll process that uses a roller having an embossed-and-engraving pattern. Here, encapsulation layer 116 and partition walls 126 have the non polarity properties.

The upper substrate 110 of the electrophortic display device is manufactured via the process described with reference to FIG. 6.

Figure 7:
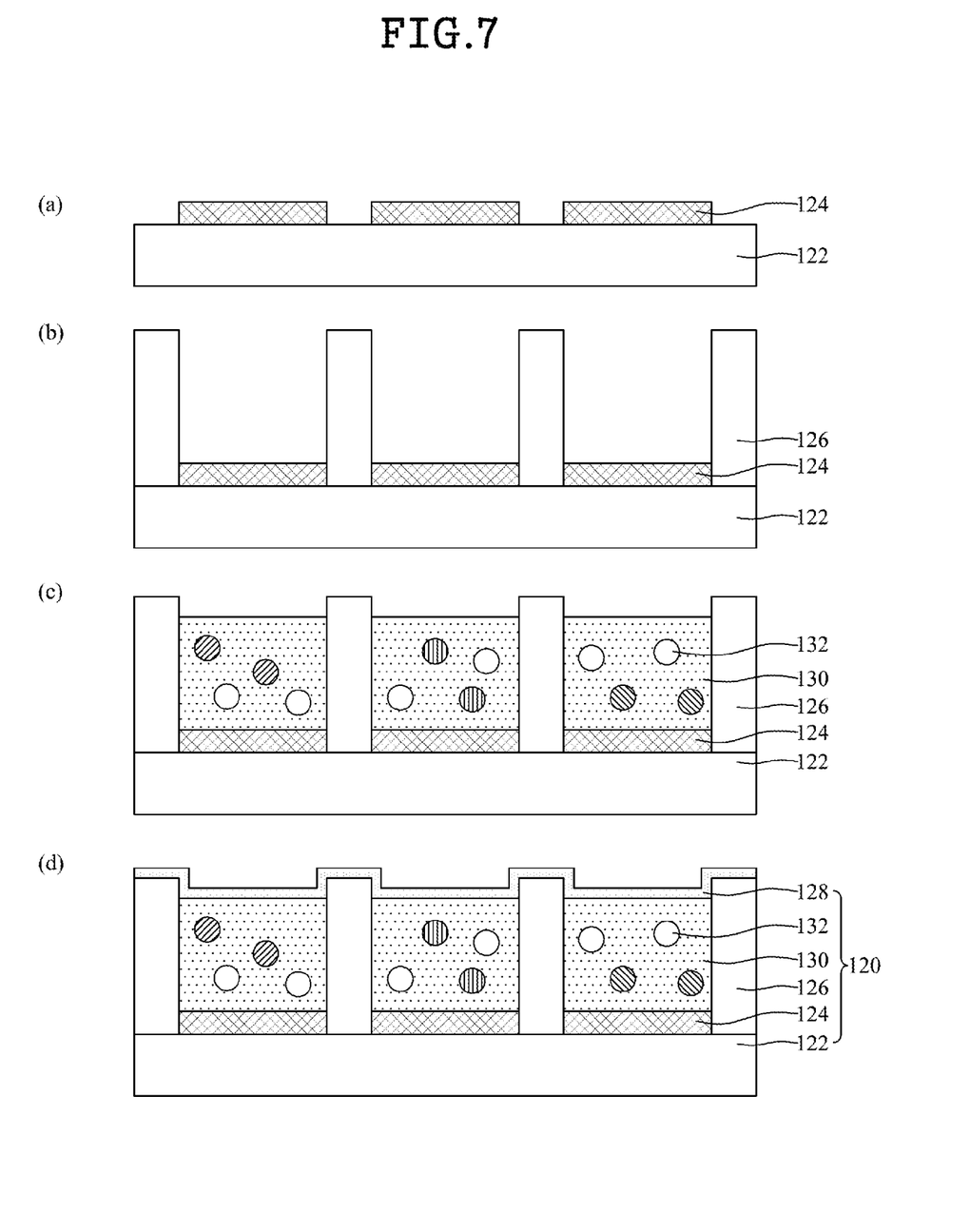
FIG. 7 is a diagram illustrating a method for manufacturing a lower substrate of the electrophoretic display device according to an exemplary embodiment of the present invention.

FIG. 7 is a diagram illustrating a method for manufacturing the lower substrate of the electrophoretic display device according to an embodiment of the present invention. The time required by the manufacture process of the upper substrate 110 described with reference to FIG. 6 may be identical to the time required by the manufacture process of the lower substrate 120, which will be described with reference to FIG. 7 as follows, thereby enabling the bonding between the upper and lower substrates 110 and 120 to be performed smoothly and efficiently.

First, as shown in FIG. 7(a), a copper, aluminum or ITO material is coated on the second base substrate (or base film) 122 having the thin film transistors (TFT) formed thereon corresponding to the plurality of sub-pixels. After that, the coated copper, aluminum or ITO material is patterned using a photolithography process and the plurality of the pixel electrodes 124 are then formed. At this time, the plurality of the pixel electrodes 124 may correspond to the plurality of the sub-pixels, respectively. Here, to form the pixel electrodes 124, nickel and/or gold may be further multilayered on the copper, aluminum or ITO material. The plurality of the sub-pixels may be defined by the partition walls 126 which will be manufactured in a following process.

As shown in FIG. 7(b), an organic material is coated on the second base substrate 122 having the pixel electrodes 124 formed thereon. After that, the organic material is patterned to form the partition walls 126. The partition walls 126 define the sub-pixels that will be filled with the electrophoretic dispersion liquid 130.

At this time, the partition wall 126 may be formed in a photolithography or mold printing process to have a predetermined height of 1 um~100 μm. Here, the partition walls 126 are in contact with the electrophoretic dispersion liquid 130 with which the sub-pixels will be filled. As a result, the partition walls 126 may be formed of an organic material with physical properties identical to the physical properties of the electrophoretic dispersion liquid 130 includes the dielectric solvent. For example, partition walls 126 and dielectric solvent have the non polarity properties.

As shown in FIG. 7(c), the eletrophoretic dispersion liquid 130 having the plurality of the charged particles 132 charged to have positive poles (+) or negative poles (−) are injected into the sub-pixels defined by the partition walls 126. As a result, the electrophoretic dispersion liquid 130 may be internalized on the lower substrate 120. Here, the sub-pixels formed on the lower substrate 120 may be filled with the electrophoretic dispersion liquid 130 using a die coating, casting, bar coating, slit coating, dispense, squeezing, screen printing, inkjet printing or photolithography method.

After that, as shown in FIG. 7(d), the interlayer 128 is formed on partition walls 126 and the sub-pixels filled with the electrophoretic dispersion liquid 130 to correspond to the encapsulation layer 116 formed on the upper substrate 110. For example, the interlayer 128 may be formed of metal ethyl keton (MEK).

The interlayer 128 prevents contact between the charged particles 132 and the encapsulation layer 116 of the upper substrate 110. Specifically, a transparent material, for example, metal ethyl keton (MEK), is coated on the partition walls 126 and the sub-pixels filled with the electrophoretic dispersion liquid 130. After that, an imprinting or photolithography process is performed with respect to the coated transparent material, and the interlayer 128 may be formed via the imprinting or photolithography process. Alternatively, the interlayer 128 may be formed in a roll-to-roll process which uses a roll having an embossed-and-engraving pattern.

In this exemplary embodiment, the interlayer 128 is formed on the lower substrate 120. However, the present invention is not limited thereto. According to another exemplary embodiment of the present invention, the interlayer 128 may be formed on the upper substrate 110. That is, the interlayer 128 may be formed on any of the substrates (i.e., the upper or lower substrates 110 and 120), because it is configured to prevent the charged particles 132 from contacting with the encapsulation layer 116 directly. When the interlayer 128 is formed on the upper layer 110, the transparent material is coated on the encapsulation layer 116 formed as shown in FIG. 6(c). After that, the interlayer 128 may be formed via the imprinting or photolithography process.

Figure 8:
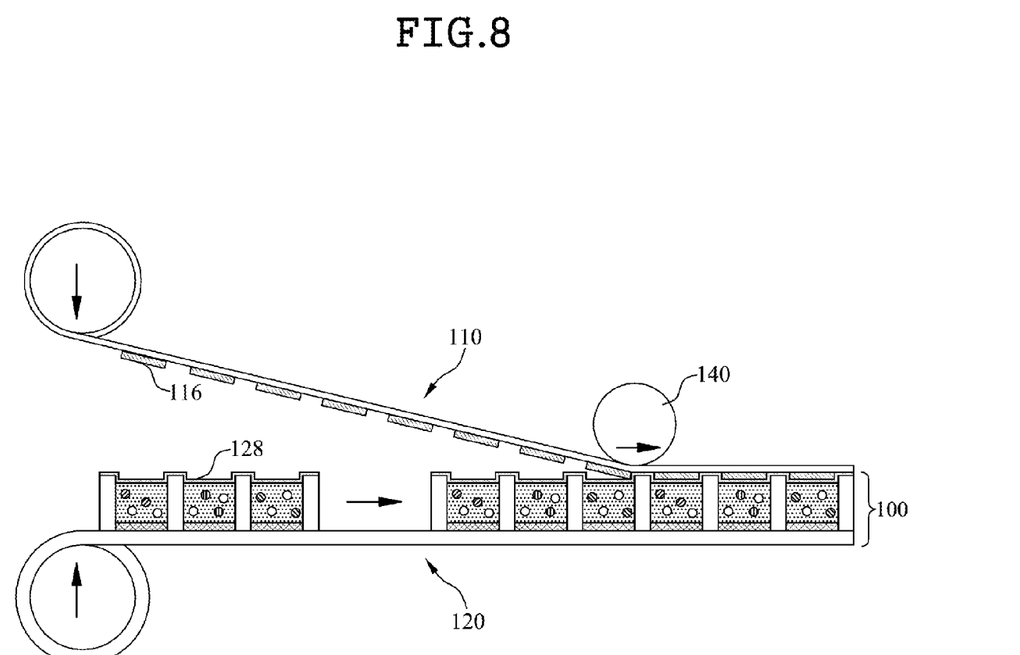
FIG. 8 is a diagram illustrating a method for bonding the upper and lower substrates to each other.

FIG. 8 is a diagram illustrating a method for bonding the upper and lower substrate 110 and 120 with each other.

With reference to FIG. 8, the upper substrate 110 manufactured according to the method shown in FIG. 6 and the lower substrate 120 manufactured according to the method shown in FIG. 7 may be bonded in a roll-to-roll process that uses a roller 140. At this time, the roll-to-roll process may have a process condition that applies a predetermined pressure to the upper and lower substrates 110 and 120 and an annealing process condition that applies a predetermined temperature to the upper and lower substrates 110 and 120.

The electrophoretic display device manufactured according to the methods described above may bond the upper and lower substrates to each other. As a result, the bonding between the upper and lower substrates may be performed smoothly and the entire manufacture process may be simplified, thereby resulting in enhanced productivity.

Furthermore, the upper and lower substrates of the electrophoretic display device according the exemplary manufacturing method of the present invention may be bonded to each other, not using sealant. The errors generated in the bonding process are reduced.

Additionally, the complete closure of the display panel is accomplished and the error of the electrophoretic display device contamination generated by external air and water elements may be prevented. As a result, productivity and reliability of the electrophoretic display device is enhanced.

Also, the electrophoretic dispersion liquid is internalized on the lower substrate 120 according to the present invention. As a result, the production cost of the electrophoretic display device is reduced.

Using the manufacturing processes described above, the electrophoretic dispersion liquid injected in the sub-pixels may be surrounded by the partition walls, the upper substrate and the lower substrate. At this time, outer walls surrounding the electrophoretic dispersion liquid, that is, the partition walls are formed of an organic material. As a result, the physical properties of the partition wall may be identical to those of the electophoretic dispersion liquid includes the dielectric solvent. In particular, the partition wall 126 has the same non polarity property as the dielectric solvent of the electrophoretic dispersion liquid 130.

Consequently, the internalization of the electrophoretic dispersion liquid on the lower substrate may be performed smoothly and efficiently. In addition, an error generated in the sub-pixels when bonding the upper and lower substrates to each other may be prevented.

The method for manufacturing the electrophoretic display device according to the exemplary embodiments of the present invention have advantages of using manufacturing infrastructures for manufacturing liquid crystal display devices.

Therefore, the present invention has numerous advantages. For example, the present invention enhances productivity of an electrophoretic display device. Also, the present invention reduces production cost of an electrophoretic display device. The present invention may provide a method for manufacturing an electrophoretic display to enhance both productivity and reliability of the electrophoretic display device. Further, the present invention prevents errors generated by overflow of electrophoretic dispersion liquid (electrophoretic ink) internalized on a lower substrate of an electrophoretic display device toward an outer portion of a display panel. The present invention prevents errors generated by overflow of sealant used to bond the upper and lower substrates of an electrophoretic display device with each other toward an inner or outer portion of the display panel. The present invention enhances a display quality of an electrophoretic display device. The present invention is to provide an electrophoretic display device that includes a lower substrate having electrophoretic dispersion liquid internalized thereon. Additionally, the present invention provides a method for manufacturing an electrophoretic display device to internalize the electrophoretic dispersion liquid on the lower substrate. The present invention may provide an electrophoretic display device to present various color images, and a method for manufacturing the electrophoretic display device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An electrophoretic display device comprising:
    a lower substrate having a plurality of pixel electrodes formed on the lower substrate and having partition walls formed on the lower substrate surrounding the pixel electrodes, the pixel electrodes and partition walls defining a plurality of sub-pixels;
    an upper substrate bonded with the lower substrate, the upper substrate having a common electrode formed thereon with an encapsulation layer formed on an area of the common electrode corresponding to the plurality of the sub-pixels;
    an electrophoretic dispersion liquid comprising a plurality of charged particles colored to display predetermined colors, the electrophoretic dispersion liquid injected into the plurality of the sub-pixels defined by the pixel electrodes and the partition walls; and
    an interlayer formed between the encapsulation layer and the electrophoretic dispersion liquid,
    wherein the interlayer is formed to prevent the electrophoretic dispersion liquid from contacting the encapsulation layer formed on the upper substrate directly,
    wherein the interlayer is formed of an insulating organic material,
    wherein each of the partition walls, the encapsulation layer and the interlayer has the non polarity properties.

2. The electrophoretic display device of claim 1, wherein the interlayer is formed on the encapsulation layer of the upper substrate.

3. The electrophoretic display device of claim 1, wherein the interlayer is formed on the partition walls and the electrophoretic dispersion liquid of the lower substrate.

4. The electrophoretic display device of claim 1, wherein the encapsulation layer is formed of a transparent material.

5. The electrophoretic display device of claim 1, wherein the partition walls are formed with a height of 1 μm~100 μm of an organic material.

6. The electrophoretic display device of claim 1, wherein the electrophoretic dispersion liquid is disposed in sub-pixels surrounded by the partition walls.

7. The electrophoretic display device of claim 1, wherein the plurality of the charged particles are colored with at least one of red, blue, green, yellow, cyan, magenta, black and white colors.

8. The electrophoretic display device of claim 1, wherein the interlayer is provided with a yellow tint to improve contrast.

9. A method for manufacturing an electrophoretic display device comprising:
    defining a plurality of sub-pixels by forming partition walls on a lower substrate to surround respective pixel electrodes formed on the lower substrate;
    forming an encapsulation layer on an area of a common electrode formed on an upper substrate, corresponding to the plurality of the sub-pixels;
    filling electrophoretic dispersion liquid comprising a plurality of charged particles colored to display colors into the plurality of the sub-pixels defined by the pixel electrodes and surrounded by the partition walls;
    forming an interlayer between the encapsulation layer and the electrophoretic dispersion liquid; and
    bonding the upper and lower substrate with the interlayer disposed between the upper and lower substrates,
    wherein the interlayer is formed on one of the upper substrate and the lower substrate, and the interlayer is formed to prevent the electrophoretic dispersion liquid from contacting the encapsulation layer formed on the upper substrate directly,
    wherein the interlayer is formed of an insulating organic material,
    wherein each of the partition walls, the encapsulation layer and the interlayer has the non polarity properties.

10. The method for manufacturing the electrophoretic display device of claim 9, wherein the upper and lower substrate are bonded with each other by a sealant around the periphery of a display area.

11. The method for manufacturing the electrophoretic display device of claim 9, wherein the interlayer is formed on the encapsulation layer of the upper substrate.

12. The method for manufacturing the electrophoretic display device of claim 9, wherein the interlayer is formed on the partition walls and the electrophoretic dispersion liquid of the lower substrate.

13. The method for manufacturing the electrophoretic display device of claim 9, wherein a transparent material is coated on the common electrode and the encapsulation layer is formed by patterning of the coated transparent material in an imprinting or photolithography process.

14. The method for manufacturing the electrophoretic display device of claim 9, wherein the encapsulation layer is formed in a roll-to-roll process which uses a roller having an embossed-and-engraving pattern.

15. The method for manufacturing the electrophoretic display device of claim 9, wherein the encapsulation layer is formed of a material which is the same as a material used to form the partition walls.

16. The method for manufacturing the electrophoretic display device of claim 9, wherein the encapsulation layer is formed of a material that is different from a material used to form the partition walls.

17. The method for manufacturing the electrophoretic display device of claim 9, wherein a transparent material is coated on the partition walls and the sub-pixels filled with the electrophoretic dispersion liquid, and the encapsulation layer is formed by patterning of the coated transparent material in an imprinting or photolithography process.

18. The method for manufacturing the electrophoretic display device of claim 9, wherein the partition walls are formed in a photolithography or mold printing process with a predetermined height of 1 μm~100 μm.

19. The method for manufacturing the electrophoretic display device of claim 9, wherein each of the sub-pixels is filled with the electrophoretic dispersion liquid according to a die coating, casting, bar coating, slit coating, dispense, squeezing, screen printing, inkjet printing or photolithography method.

20. The method for manufacturing the electrophoretic display device of claim 9, wherein the lower and upper substrates are bonded to each other according to a roll-to-roll process.

21. The method for manufacturing the electrophoretic display device of claim 9, wherein the interlayer is provided with a yellow tint to improve contrast.

\* \* \* \* \*